(12) United States Patent
Schoolcraft

(10) Patent No.: US 9,328,775 B2
(45) Date of Patent: May 3, 2016

(54) THREE-POSITION DOG CLUTCH

(71) Applicant: Allison Transmission, Inc., Indianapolis, IN (US)

(72) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/212,638

(22) Filed: Mar. 14, 2014

(65) Prior Publication Data

US 2014/0262671 A1    Sep. 18, 2014

Related U.S. Application Data

(60) Provisional application No. 61/799,200, filed on Mar. 15, 2013.

(51) Int. Cl.
*F16D 11/08*  (2006.01)
*F16D 11/10*  (2006.01)
*F16D 63/00*  (2006.01)

(52) U.S. Cl.
CPC ............... *F16D 11/08* (2013.01); *F16D 11/10* (2013.01); *F16D 63/006* (2013.01)

(58) Field of Classification Search
CPC .............. F16D 11/08; F16D 2011/006; F16D 2127/005; F16D 2500/50607; F16D 2011/002
USPC ........................................................ 192/54.1
See application file for complete search history.

(56) References Cited

U.S. PATENT DOCUMENTS

| 2,347,873 | A | 5/1944 | Bloomfield |
| 2,410,818 | A | 11/1946 | Grant |
| 2,554,221 | A | 5/1951 | Stephenson et al. |
| 2,583,843 | A | 1/1952 | Herrick |

(Continued)

FOREIGN PATENT DOCUMENTS

| DE | 102007010292 | * | 4/2008 |
| EP | 1519084 A2 | | 9/2004 |

(Continued)

OTHER PUBLICATIONS

Machine language translation of DE 102007010292.*

(Continued)

*Primary Examiner* — Ramya Burgess
*Assistant Examiner* — Mark Manley
(74) *Attorney, Agent, or Firm* — Barnes & Thornburg LLP

(57) ABSTRACT

A multi-positional dog clutch selectively engageable with a transmission is disclosed. The dog clutch includes a shift fork, a dog clutch carrier, a common member, and first and second dog clutch sliding members. The transmission includes first and second fixed members. The first dog clutch sliding member is configured to engage with and disengage from the first fixed member. The second dog clutch sliding member is configured to engage with and disengage from the second fixed member. The dog clutch carrier is movable to (i) a first position in which the first dog clutch sliding member is engaged with the first fixed member, (ii) a second position in which the second dog clutch sliding member is engaged with the second fixed member, and (iii) a third position in which the first dog clutch sliding member is engaged with the first fixed member and the second dog clutch sliding member is engaged with the second fixed member.

19 Claims, 5 Drawing Sheets

(56) References Cited

U.S. PATENT DOCUMENTS

| | | | |
|---|---|---|---|
| 2,596,654 A | 5/1952 | Clark et al. |
| 2,718,292 A | 9/1955 | Meilander et al. |
| 2,841,330 A | 7/1958 | Brewer et al. |
| 3,324,744 A | 6/1967 | Roper |
| 3,432,016 A | 3/1969 | Vogt |
| 3,481,436 A | 12/1969 | Wilkowski |
| 3,631,741 A | 1/1972 | Kelbel |
| 3,910,131 A | 10/1975 | Richards |
| 4,114,478 A | 9/1978 | Clauss |
| 4,361,217 A | 11/1982 | Bieber et al. |
| 4,381,828 A | 5/1983 | Lunn et al. |
| 4,813,524 A | 3/1989 | Reik |
| 5,152,726 A | 10/1992 | Lederman |
| 5,261,801 A * | 11/1993 | Stone ................. 418/69 |
| 5,355,981 A | 10/1994 | Itoh et al. |
| 5,407,024 A | 4/1995 | Watson et al. |
| 5,441,130 A | 8/1995 | Ha |
| 5,538,121 A | 7/1996 | Hering |
| 5,584,776 A | 12/1996 | Weilant et al. |
| 5,653,322 A | 8/1997 | Vasa et al. |
| 5,662,198 A | 9/1997 | Kojima et al. |
| 5,704,867 A | 1/1998 | Bowen |
| 5,771,477 A | 6/1998 | Showalter et al. |
| 5,833,566 A | 11/1998 | Showalter |
| 5,884,526 A | 3/1999 | Fogelberg |
| 5,893,812 A | 4/1999 | Narai et al. |
| 5,918,715 A | 7/1999 | Ruth et al. |
| 5,992,592 A | 11/1999 | Showalter |
| 6,062,361 A | 5/2000 | Showalter |
| 6,149,540 A | 11/2000 | Johnson et al. |
| 6,149,543 A | 11/2000 | Breen |
| 6,155,395 A | 12/2000 | Braford |
| 6,251,045 B1 | 6/2001 | Oliveira et al. |
| 6,460,671 B1 | 10/2002 | Karambelas et al. |
| 6,588,559 B2 | 7/2003 | Blair |
| 6,672,442 B2 | 1/2004 | Kato et al. |
| 6,679,367 B2 | 1/2004 | Baker et al. |
| 6,790,153 B2 | 9/2004 | Goto |
| 6,834,750 B2 | 12/2004 | Baker et al. |
| 6,846,257 B2 | 1/2005 | Baker et al. |
| 7,052,430 B2 | 5/2006 | Stevenson et al. |
| 7,189,182 B2 | 3/2007 | Stevenson et al. |
| 7,204,337 B2 | 4/2007 | Wildfellner |
| 7,219,569 B2 | 5/2007 | Jastrzembowski et al. |
| 8,152,673 B2 | 4/2012 | Yanay |
| 8,298,112 B2 | 10/2012 | Takada |
| 2002/0005325 A1 | 1/2002 | Yamada |
| 2003/0051959 A1 | 3/2003 | Blair |
| 2003/0226415 A1 | 12/2003 | Baker et al. |
| 2004/0104096 A1 | 6/2004 | Genise |
| 2007/0155579 A1 | 7/2007 | Thompson |
| 2008/0234093 A1 * | 9/2008 | Diosi et al. ................. 475/276 |

FOREIGN PATENT DOCUMENTS

| | | |
|---|---|---|
| GB | 435497 | 9/1935 |
| GB | 494338 | 10/1938 |
| WO | 9849455 A2 | 11/1998 |
| WO | 2010048029 A2 | 4/2010 |

OTHER PUBLICATIONS

U.S. Appl. No. 61/798,476, entitled "Split Power Infinitely Variable Transmission," by Brian Schoolcraft, filed Mar. 15, 2013, 45 pages.

U.S. Appl. No. 61/799,200, entitled "Three-Position Dog Clutch," by Brian Schoolcraft, filed Mar. 15, 2013, 31 pages.

U.S. Appl. No. 61/794,523, entitled "Variator Bypass Clutch," by James Raszkowski et al., filed Mar. 15, 2013, 31 pages.

Search Report and Written Opinion from the ISA for Application No. PCT/US2014/028839, dated Aug. 5, 2014, 8 pages.

* cited by examiner

THREE-POSITION DOG CLUTCH

CROSS REFERENCE TO RELATED U.S. APPLICATIONS

This application claims priority to and the benefit of Provisional U.S. Patent Application Ser. No. 61/799,200 entitled "THREE-POSITION DOG CLUTCH," which was filed on Mar. 15, 2013, the entirety of which is incorporated herein by reference.

BACKGROUND

A dog clutch is a type of clutch used to couple or lock two components together to transfer rotational power from a driving component to a driven component. For example, dog clutches are often used to couple or lock a driving shaft to a driven shaft, to couple or lock a driving shaft to a gear, and/or to engage one or more torque-transmitting clutches with one or more gears to transfer rotational power from the clutches to the corresponding gears.

Dog clutches are used in many different applications including transmissions of motor vehicles. In general, the transmission of a motor vehicle includes a number of selectively engageable clutches. Selective engagement and/or disengagement of the clutches establishes speed or gear ratios between the transmission input shaft and the transmission output shaft. In particular, shifting from a currently established gear ratio to a new gear ratio generally requires disengaging a clutch (i.e., the "off-going clutch") associated with the current gear ratio and engaging a clutch (i.e., the "oncoming clutch") associated with the desired new gear ratio.

SUMMARY

According to one aspect, a multi-positional dog clutch includes a dog clutch carrier, a first dog clutch sliding member coupled to the dog clutch carrier, engaged with a common member, and configured to engage with and disengage from a first fixed member of a transmission, a second dog clutch sliding member coupled to the dog clutch carrier, engaged with the common member, and configured to engage with and disengage from a second fixed member of the transmission, and a separator spring surrounding the dog clutch carrier between the first dog clutch sliding member and the second dog clutch sliding member. The dog clutch carrier is movable to a first carrier position in which the first dog clutch sliding member is engaged with the first fixed member, a second carrier position in which the second dog clutch sliding member is engaged with the second fixed member, and a third carrier position in which the first dog clutch sliding member is engaged with the first fixed member and the second dog clutch sliding member is engaged with the second fixed member.

In some embodiments, the dog clutch carrier may include a carrier pin. The first and second dog clutch sliding members may each be coupled to the carrier pin.

In some embodiments, the carrier pin may extend into an inner passageway of the separator spring.

In some embodiments, the carrier pin may define a longitudinal axis. The first and second dog clutch sliding members may be movable along the longitudinal axis to engage with the corresponding first and second fixed member.

In some embodiments, the common member may include a spline and the first dog clutch sliding member may include a first spline. The first spline may be engaged with the spline of the common member in each of the first, second, and third carrier positions.

In some embodiments, the second dog clutch sliding member may include a second spline. The second spline may be engaged with the spline of the common member in each of the first, second, and third carrier positions.

In some embodiments, the first dog clutch sliding member may include a third spline and the first fixed member may include a spline. The spline of the first fixed member may be engaged with the third spline when the first dog clutch sliding member is engaged with the first fixed member.

In some embodiments, the second dog clutch sliding member may include a fourth spline and the second fixed member may include a spline. The spline of the second fixed member may be engaged with the fourth spline when the second dog clutch sliding member is engaged with the second fixed member.

In some embodiments, the multi-positional dog clutch may further include a shift fork. The shift fork may be coupled to the dog clutch carrier and may be actuated to move the dog clutch carrier to the first, second, and third carrier positions. The shift fork may be spaced apart from the second fixed member a first distance in the first carrier position, a second distance in the second carrier position, and a third distance in the third carrier position. The second distance may be less than the first distance. The third distance may be greater than the second distance.

According to another aspect, a transmission includes a shift fork, a dog clutch carrier coupled to the shift fork, a first fixed member, a second fixed member, a first dog clutch sliding member coupled to the dog clutch carrier, and a second dog clutch sliding member coupled to the dog clutch carrier. The first dog clutch sliding member is configured to engage with and disengage from the first fixed member and the second dog clutch sliding member is configured to engage with and disengage from the second fixed member. The transmission further includes a common member engaged with each of the first and second dog clutch sliding members and a separator spring surrounding the dog clutch carrier between the first and second dog clutch sliding members. The shift fork is actuatable to move the dog clutch carrier to a first position in which the first dog clutch sliding member is engaged with the first fixed member, a second position in which the second dog clutch sliding member is engaged with the second fixed member, and a third position in which the first dog clutch sliding member is engaged with the first fixed member and the second dog clutch sliding member is engaged with the second fixed member.

In some embodiments, the dog clutch carrier may include a carrier pin. The carrier pin may define a longitudinal axis. The first and second dog clutch sliding members may be coupled to the carrier pin and movable along the longitudinal axis to selectively engage the corresponding first and second fixed member.

In some embodiments, the separator spring may apply a biasing force to each of the first and second dog clutch sliding members to outwardly bias the first and second dog clutch sliding members from each other.

In some embodiments, the first fixed member may be engaged with the first dog clutch sliding member in the third carrier position such that the first dog clutch sliding member is prevented from moving along the longitudinal axis while a torque transmitted from the first fixed member to the first dog clutch sliding member is above a first torque threshold.

In some embodiments, the first fixed member may be engaged with the first dog clutch sliding member in the third carrier position such that the biasing force of the separator spring is sufficient to move the first dog clutch sliding member along the longitudinal axis in response to the transmitted torque falling below the first torque threshold.

In some embodiments, the first fixed member may be engaged with the first dog clutch sliding member in the second carrier position such that the first dog clutch sliding member is prevented from moving along the longitudinal axis while a torque transmitted from the first fixed member to the first dog clutch sliding member is above a second torque threshold.

In some embodiments, the first fixed member may be engaged with the first dog clutch sliding member in the second carrier position such that the biasing force of the separator spring is sufficient to move the first dog clutch sliding member along the longitudinal axis in response to the transmitted torque falling below the second torque threshold.

In some embodiments, the second fixed member may be engaged with the second dog clutch sliding member in the first carrier position such that the second dog clutch sliding member is prevented from moving along the longitudinal axis while a torque transmitted from the second fixed member to the second dog clutch sliding member is above a third torque threshold.

In some embodiments, the second fixed member may be engaged with the second dog clutch sliding member in the first carrier position such that the biasing force of the separator spring is sufficient to move the second dog clutch sliding member along the longitudinal axis in response to the transmitted torque falling below the third torque threshold.

In another aspect, a method for selectively engaging a multi-positional dog clutch with a transmission includes moving a dog clutch carrier of the multi-positional dog clutch to a first carrier position in which the first dog clutch sliding member of the multi-positional dog clutch is engaged with a first fixed member of the transmission and a second dog clutch sliding member of the multi-positional dog clutch is disengaged from a second fixed member of the transmission, moving the dog clutch carrier to a second carrier position in which the first dog clutch sliding member is disengaged from the first fixed member and the second dog clutch sliding member is engaged with the second fixed member, and moving the dog clutch carrier to a third carrier position in which the first dog clutch sliding member is engaged with the first fixed member and the second dog clutch sliding member is engaged with the second fixed member.

In some embodiments, the method for selectively engaging the multi-positional dog clutch with the transmission may further include disengaging the second fixed member from the second dog clutch sliding member when the dog clutch carrier is in the first carrier position in response to a torque transmitted from the second fixed member to the second dog clutch sliding member falling below a first torque threshold and disengaging the first fixed member from the first dog clutch sliding member when the dog clutch carrier is in the second carrier position in response to the torque transmitted from the first fixed member to the first dog clutch sliding member falling below a second torque threshold.

BRIEF DESCRIPTION

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
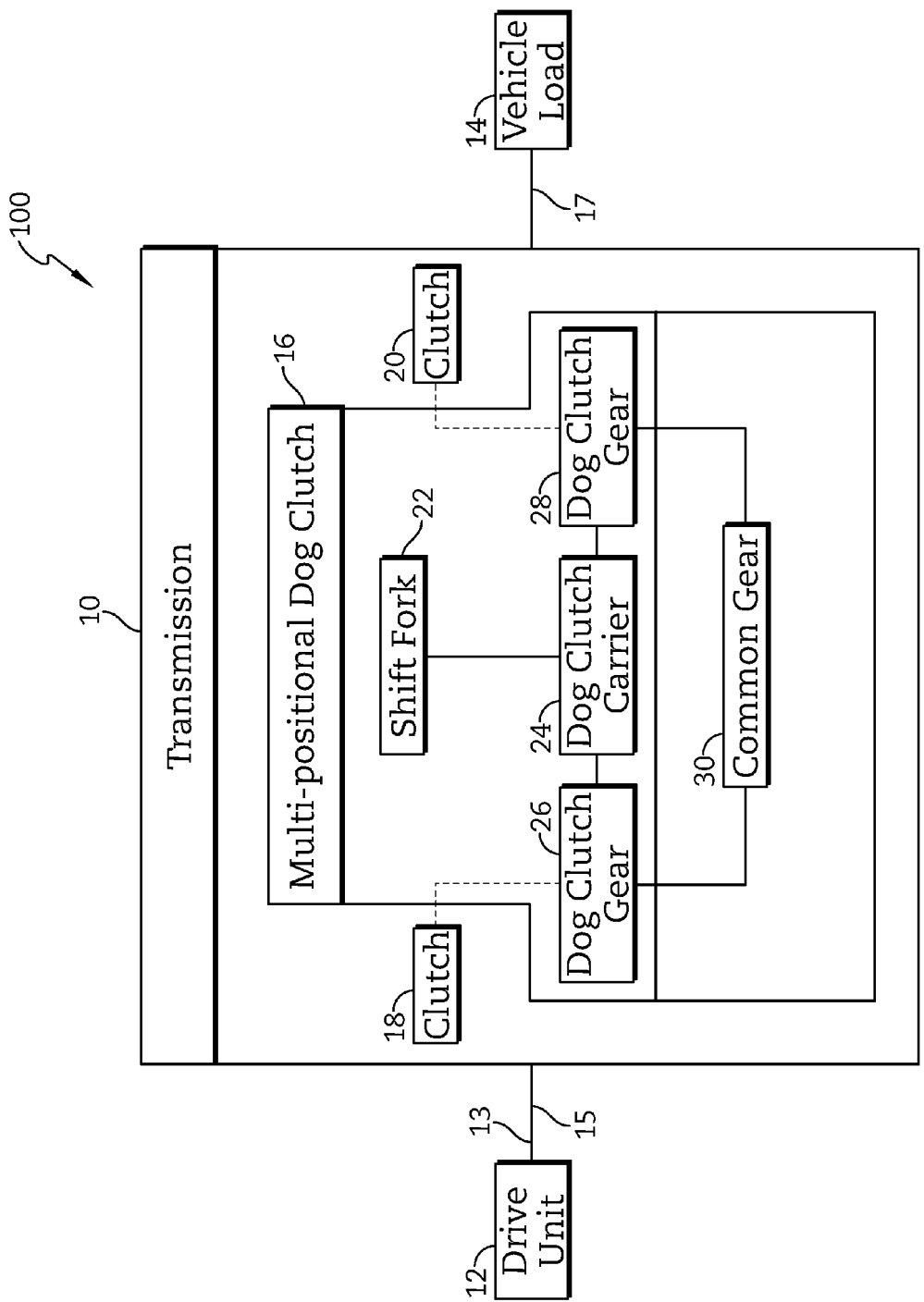
FIG. 1 is a simplified block diagram of at least one embodiment of a transmission including a multi-positional dog clutch coupled to a drive unit and a vehicle load of an illustrative motor vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative motor vehicle 100 includes a drive unit 12, a transmission 10 coupled to the drive unit 12, and a vehicle load 14 coupled to the transmission 10. The drive unit 12 may be embodied as any type of motor or internal combustion engine having a reciprocating or a rotary configuration that provides rotational power to the transmission 10 and therethrough to the vehicle load 14. For instance, the drive unit 12 may be embodied as a four-stroke piston engine, a diesel engine, or a rotary engine. The vehicle load 14 may be embodied as, or otherwise include, drive wheels, caterpillar tracks, propels, etc. that impart the motor vehicle 100 with locomotion when driven by the drive unit 12 via the transmission 10.

Rotational power is generated by the drive unit 12 and transmitted to the transmission 10 via a drive unit output shaft 13, included in the drive unit 12. The drive unit output shaft 13 is coupled to a transmission input shaft 15 included in the transmission 10. Additionally, rotational power from the transmission 10 is transmitted from a transmission output shaft 17 to the vehicle load 14.

The transmission 10 ensures the controlled application of rotational power generated by the drive unit 12 to the vehicle load 14. The transmission 10 may include a plurality of gearsets and/or gear trains providing gear ratios that enable speed and torque generated by the drive unit 12 to be converted for use by the vehicle load 14. The transmission 10 may be embodied as a conventional automotive transmission, such as a manual transmission, an automatic transmission, or a semi-automatic transmission, and may include a main shaft, a counter shaft, an idler shaft, and other components commonly found in automotive transmissions. Alternatively, in some embodiments, the transmission 10 may be embodied as a continuously variable transmission (CVT) or an infinitely variable transmission (IVT).

The transmission 10 includes a number of torque-transmitting devices, such as multiple rotating and/or stationary clutches, to facilitate the transfer of torque from the drive unit 12 to the vehicle load 14. In the illustrative embodiment of FIG. 1, the torque-transmitting devices include a first fixed member 18, a second fixed member 20, and a multi-positional dog clutch 16. It should be noted that each of the first and second fixed member 18, 20 is referred to in FIG. 1 as the first and second "clutch," respectively. As discussed in more detail below, the multi-positional dog clutch 16 is selectively engagable with one or both of the fixed members 18, to operatively couple the fixed members 18, 20 to a common member 30 of the transmission 10. Each of the fixed members 18, 20 may be embodied as any fixed member of the transmission 10 capable of being operatively coupled to a common member 30. It should be noted that the common member 30 is referred to in FIG. 1 as the common "gear."

The multi-positional dog clutch 16, in conjunction with the fixed members 18, 20 may be used to couple two rotating shafts of the transmission 10 (e.g., a driving shaft and a driven shaft of the transmission 10). The multi-positional dog clutch 16 alternatively may be used to couple two rotating components included in the transmission 10, such as a gearset and a corresponding shaft. In some embodiments, the multi-positional dog clutch 16 may be embodied as a positive engagement clutch that reduces or eliminates slip between rotating components and minimizes wear so as to provide a longer lifecycle as compared to conventional clutches that transmit torque through friction.

In the illustrative embodiment of FIG. 1, the multi-positional dog clutch 16 includes a shift fork 22, a dog clutch carrier 24, a first dog clutch sliding member 26, and a second dog clutch sliding member 28. It should be noted that each of the first and second dog clutch sliding member 26, 28 is referred to in FIG. 1 as the first and second dog clutch "gear," respectively. The shift fork 22 is coupled to the dog clutch carrier 24, and the dog clutch carrier 24 is coupled to both of the dog clutch sliding members 26, 28. Each of the dog clutch sliding members 26, 28 is coupled to the common member 30. In the illustrative embodiment of FIG. 1, the first fixed member 18 is selectively engageable with the first dog clutch sliding member 26, and the second fixed member 20 is selectively engageable with the second dog clutch sliding member 28. Of course, it should be appreciated that the terms "first" and "second" are used herein only as identifiers and that clutches 18, 20 and dog clutch sliding members 26, 28 may be arranged to cooperate differently in other embodiments. For example, in some embodiments, the first fixed member 18 may be selectively engageable with the second dog clutch sliding member 28, and the second fixed member 20 may be selectively engageable with the first dog clutch sliding member 26.

The transmission 10 may also include one or more actuators (not shown) configured to control the position of the various torque-transmitting devices. For example, the transmission 10 may include hydraulic solenoids configured to control the position of the first and second fixed members 18, 20 to direct engagement of the fixed members 18, 20 with the multi-positional dog clutch 16. The transmission 10 may also include a transmission control module (TCM), which may be operatively coupled to the actuators included in the transmission 10. The TCM may also be coupled to various sensors included in the motor vehicle 100 to provide the TCM with various operating conditions associated with the operation of the transmission 10, the drive unit 12, and/or the vehicle load 14. For example, the motor vehicle 100 may include a pair of engagement sensors (not shown) that provide the TCM with signals indicative of whether the first and second fixed members 18, 20 are engaged with the multi-positional dog clutch 16. The TCM may be implemented using analog and/or digital circuit components. For example, the TCM may include a processor such as a microcontroller or microprocessor and one or more memory devices such as read only memory devices, flash memory device, random access memory devices, and/or other storage devices that store instructions to be executed and data to be processed by the processor of the TCM.

Referring now to FIGS. 2-7, the multi-positional dog clutch 16 is controllable to one of several different configurations to control engagement of the fixed members 18, 20 with the corresponding dog clutch sliding members 26, 28. For example, the multi-positional dog clutch 16 is controllable to engage the first fixed member 18 with the first dog clutch sliding member 26 (see FIGS. 2 and 7), engage the second fixed member 20 with the second dog clutch sliding member 28 (see FIGS. 5 and 6), or engage both the first fixed member 18 with the first dog clutch sliding member 26 and the second fixed member 20 with the second dog clutch sliding member 28 via movement of the shift fork 22 (see FIGS. 3 and 4). As discussed in more detail below, engagement of one or more of the fixed members 18, 20 with the respective dog clutch sliding members 26, 28 may be maintained even after the multi-positional dog clutch 16 is controlled to a new configuration. Subsequently, one or more of the fixed members 18, 20 may disengage from the corresponding dog clutch sliding member 26, 28. The multi-positional dog clutch 16 is controlled to the different configurations via movement of the shift fork 22.

In some embodiments, the shift fork 22 may be coupled to an actuator included in the transmission 10 and may be movable to a first fork position 31, a second fork position 32, and a third fork position 33 as shown in FIGS. 2-7. As shown in FIGS. 2-7, the shift fork 22 is coupled to the dog clutch carrier 24 such that the actuation of the shift fork 22 to the first, second, and third fork positions 31, 32, 33 moves to the dog clutch carrier 24 to a first carrier position 35, a second carrier position 37, and a third carrier position 39, respectively.

Figure 2:
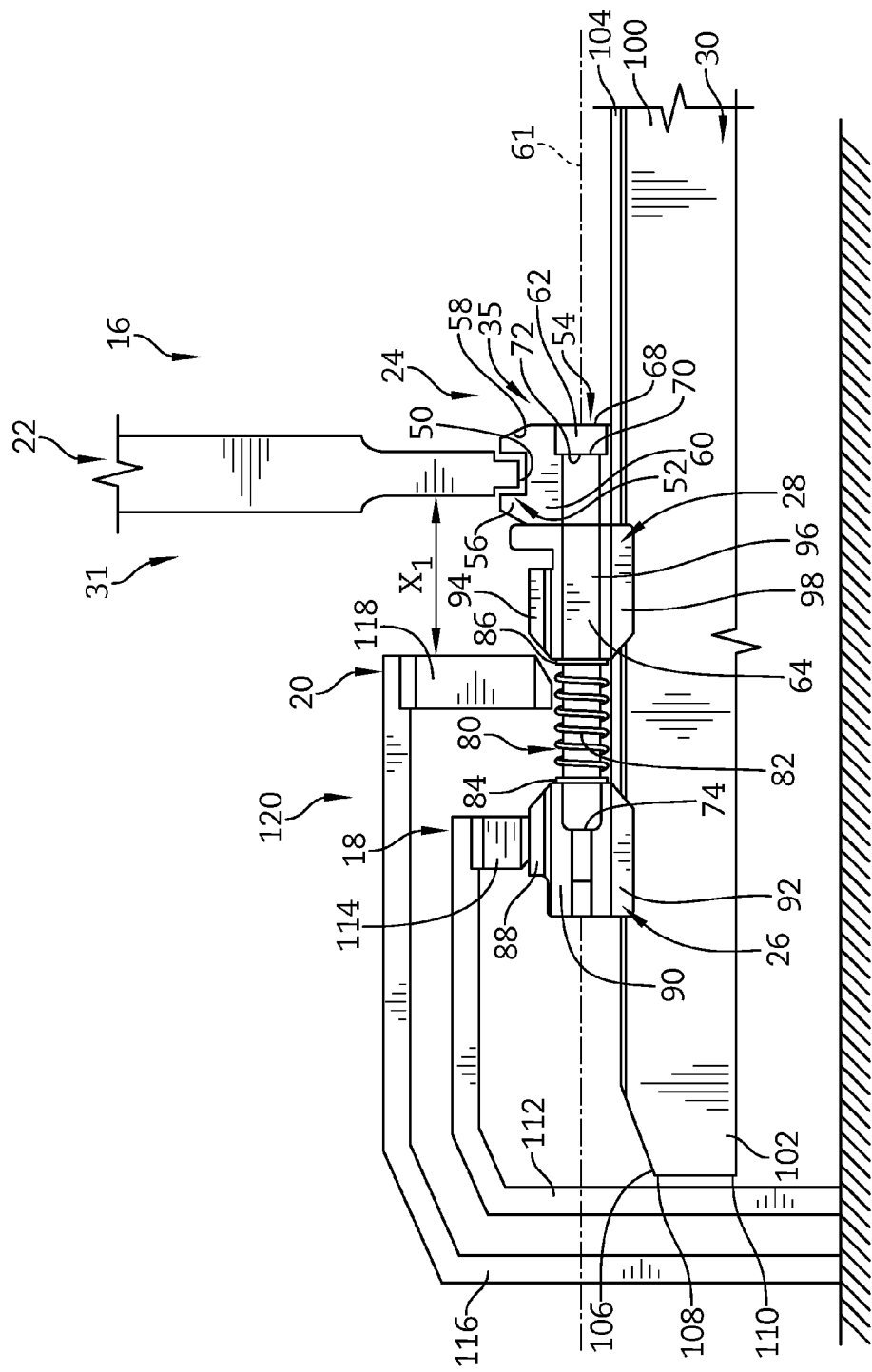
FIG. 2 shows a dog clutch carrier of the multi-positional dog clutch in a first carrier position associated with a first low torque condition.

Referring now to FIG. 2, the multi-positional dog clutch 16 is shown with the shift fork 22 in the first fork position 31 in which the shift fork 22 is spaced apart a distance X1 from the second fixed member 20 and the dog clutch carrier 24 is in the first carrier position 35.

The dog clutch carrier 24 includes a notch 52 and a carrier pin 54. The shift fork 22 is received in the notch 52 such that the shift fork 22 is coupled to the dog clutch carrier 24 when the shift fork 22 is in the first fork position 31, the second fork position 32, and the third fork position 33 as shown in FIGS. 2-7. The dog clutch carrier 24 further includes a first quadrilateral section 56, a second quadrilateral section 58, and a carrier rectangular section 60. The first and second quadrilateral sections 56, 58 lie adjacent to the notch 52 and are interconnected with and positioned above the carrier rectangular section 60 relative to the common member 30.

The carrier pin 54 of the dog clutch carrier 24 defines a longitudinal axis 61 and includes a head 62 and a body 64 as shown in FIGS. 2-7. The head 62 includes a first head end 68 and a second head end 70. The head 62 extends away from the first head end 68 and toward the second head end 70 and terminates at the second head end 70. The head 62 is coupled to the body 64 at the second head end 70. The body 64 includes a first body end 72 and a second body end 74. The body 64 extends away from the first body end 72 and toward the second body end 74 and terminates at the second body end 74.

A separator spring 80 surrounds the body 64 of the carrier pin 54 of the dog clutch carrier 24 as shown in FIGS. 2-7. The carrier pin 54 extends into and through an inner passageway 82 formed by the separator spring 80. The separator spring 80 is positioned to lie along the longitudinal axis 61 between the first dog clutch sliding member 26 and the second dog clutch sliding member 28. The separator spring 80 includes a first tang 84 and a second tang 86. The first and second tangs 84, 86 are engaged with the first and second dog clutch sliding members 26, 28 and define the ends of the separator spring 80. The length of the separator spring 80 is defined by the distance between the first and second dog clutch sliding members 26, 28 along the longitudinal axis 61 as shown in FIGS. 2-7. The separator spring 80 applies a first biasing force to the first dog clutch sliding member 26 and a second biasing force to the second dog clutch sliding member 28 so that the first and second dog clutch sliding members 26, 28 are outwardly biased from one another in the first fork position 31/first carrier position 35, the second fork position 32/second carrier position 37, and the third fork position 33/third carrier position 39 as shown in FIGS. 2-7.

The first dog clutch sliding member 26 is coupled to the body 64 of the carrier pin 54 so that the first dog clutch sliding member 26 lies along the longitudinal axis 61 as shown in FIGS. 2-7. The first dog clutch sliding member 26 includes a first upper section 88, a first middle section 90, and a first lower section 92. The first upper section 88 interconnects with the first middle section 90 and is positioned above the middle section 90 relative to the common member 30. The first middle section 90 interconnects with the first lower section 92 and is positioned above the first lower section 92 relative to the common member 30.

The first upper section 88 of the first dog clutch sliding member 26 is configured to engage the first fixed member 18 as shown in FIGS. 2-7. The first dog clutch sliding member 26 includes a first upper spline formed in the first upper section 88 that may be engaged with a first fixed member spline included in the first fixed member 18. The first upper spline of the first dog clutch sliding member 26 may be fully engaged with, partially engaged with, or disengaged from the first fixed member spline of the first fixed member 18 as shown in FIGS. 2-7.

The first middle section 90 of the first dog clutch sliding member 26 is coupled to the body 64 of the carrier pin 54 as shown in FIGS. 2-7. The first middle section 90 is also engaged with the first tang 84 of the separator spring 80. The longitudinal axis 61 extends through the first middle section 90 of the first dog clutch sliding member 26 as shown in FIGS. 2-7.

The first lower section 92 of the first dog clutch sliding member 26 is engaged with the common member 30 as shown in FIGS. 2-7. The first dog clutch sliding member 26 includes a first lower spline formed in the first lower section 92 that is engaged with a common spline included in the common member 30. The first lower spline of the first dog clutch sliding member 26 is engaged with the common spline of the common member 30 when the shift fork 22 is in the first, second, and third fork positions 31, 32, 33 and the dog clutch carrier 24 is in the first, second, and third carrier positions 35, 37, and 39 as shown in FIGS. 2-7.

As shown in FIGS. 2-7, the first dog clutch sliding member 26 may be moved along the longitudinal axis 61 defined by the carrier pin 54 to engage with, partially engage with, or disengage from the first fixed member 18. The separator spring 80 is compressed as the first dog clutch sliding member 26 moves along the longitudinal axis 61 toward the second dog clutch sliding member 28, and the separator spring 80 is extended as the first dog clutch sliding member 26 moves along the longitudinal axis 61 away from the second dog clutch sliding member 28 as shown in FIGS. 2-7.

The second dog clutch sliding member 28 is slidably coupled to the body 64 of the carrier pin 54 so that the second dog clutch sliding member 28 lies along the longitudinal axis 61 as shown in FIGS. 2-7. The second dog clutch sliding member 28 includes a second upper section 94, a second middle section 96, and a second lower section 98. The second upper section 94 interconnects with the second middle section 96 and is positioned above the second middle section 96 relative to the common member 30. The second middle section 96 interconnects with the second lower section 98 and is positioned above the second lower section 98 relative to the common member 30.

The second upper section 94 of the second dog clutch sliding member 28 is configured to engage the second fixed member 20 as shown in FIGS. 2-7. The second dog clutch sliding member 28 includes a second upper spline formed in the second upper section 94 that may be engaged with a second fixed member spline included in the second fixed member 20. The second upper spline of the second dog clutch 28 may be fully engaged with, partially engaged with, or disengaged from the second fixed member spline of the second fixed member 20 as shown in FIGS. 2-7.

The second middle section 96 of the second dog clutch sliding member 28 is slidably coupled to the body 64 of the carrier pin 54 as shown in FIGS. 2-7. The second middle section 96 is also engaged with the second tang 86 of the separator spring 80. The longitudinal axis 61 extends through the second middle section 96 of the second dog clutch sliding member 28 as shown in FIGS. 2-7.

The second lower section 98 of the second dog clutch sliding member 28 is engaged with the common member 30 as shown in FIGS. 2-7. The second dog clutch sliding member 28 includes a second lower spline formed in the second lower section 98 that is engaged with the common spline included in the common member 30. The second lower spline of the second dog clutch sliding member 28 is engaged with the common spline of the common member 30 when the shift fork 22 is in the first, second, and third fork positions 31, 32, 33 and the dog clutch carrier 24 is in the first, second, and third carrier positions 35, 37, and 39 as shown in FIGS. 2-7.

As shown in FIGS. 2-7, the second dog clutch sliding member 28 may be moved relative to the carrier pin 54 of the dog clutch carrier 24 along the longitudinal axis 61 defined by the carrier pin 54 to engage with, partially engage with, or disengage from the second fixed member 20. The separator spring 80 is compressed as the second dog clutch sliding member 28 moves along the longitudinal axis 61 toward the first dog clutch sliding member 26, and the separator spring 80 is extended as the second dog clutch sliding member 28 moves along the longitudinal axis 61 away from the first dog clutch sliding member 26 as shown in FIGS. 2-7.

The common member 30 is engaged with the first dog clutch sliding member 26 and the second dog clutch sliding member 28 when the shift fork 22 is in the first, second, and third fork positions 31, 32, 33 and the dog clutch carrier 24 is in the first, second, and third carrier positions 35, 37, and 39 as shown in FIGS. 2-7. The common member 30 includes an upper common section 100 and a lower common section 102. The upper common section 100 includes a first end 104 and a second common end 106. The upper common section 100 extends away from the first common end 104 and toward the lower common section 102 and terminates at the second common end 106. The lower common section 102 includes a third common end 108 and a fourth common end 110. The lower common section 102 extends away from the third common end 108 and toward the fourth common end 110 and terminates at the fourth common end 110. The upper common section 100 interconnects with the lower common section 102 and is positioned above the lower common section 102 relative to the carrier pin 54.

The common spline of the common member 30 is formed in the upper common section 100 as shown in FIGS. 2-7. The common spline lies substantially parallel to the longitudinal axis 61 defined by the carrier pin 54. In addition, the common spline lies substantially parallel to the first fixed member spline, the first upper spline, the first lower spline, the second fixed member spline, the second upper spline, and the second lower spline as suggested in FIGS. 2-7.

The first fixed member 18 of the transmission 10 is stationary relative to the shift fork 22, the dog clutch carrier 24, and the first and second dog clutch sliding members 26, 28 as shown in FIGS. 2-7. The first fixed member 18 includes a first support portion 112 and a first engagement portion 114. The first support portion 112 provides support for the first engagement portion 114 while torque is transmitted from the first engagement portion 114 to the first dog clutch sliding member 26 of the multi-positional dog clutch 16. The first fixed member spline is arranged on the first engagement portion 114 as shown in FIGS. 2-7.

The second fixed member 20 of the transmission 10 is stationary relative to the shift fork 22, the dog clutch carrier 24, and the first and second dog clutch sliding members 26, 28 as shown in FIGS. 2-7. The second fixed member 20 includes a second support portion 116 and a second engagement portion 118. The second support portion 116 provides support for the second engagement portion 118 while torque is transmitted from the second engagement portion 118 to the second dog clutch sliding member 28 of the multi-positional dog clutch 16. The second fixed member spline is arranged on the second engagement portion 118 as shown in FIGS. 2-7.

Referring again to FIG. 2, the first dog clutch sliding member 26 is fully engaged with the first fixed member 18 while the second dog clutch sliding member 28 is disengaged from the second fixed member 20. The positions of the first and second dog clutch sliding members 26, 28 relative to one another along the longitudinal axis 61 and the length of the separator spring 80 are associated with a first relaxed state 120 occurring at the interface between the second fixed member 20 and the second dog clutch sliding member 28.

In the first relaxed state 120 shown in FIG. 2, torque is transmitted from the first fixed member 18 to the first dog clutch sliding member 26 above a third torque threshold. The torque transmitted from the first fixed member 18 to the first dog clutch sliding member 26 above the third torque threshold is sufficiently high that it overcomes the first biasing force applied to the first dog clutch sliding member 26 by the separator spring 80 and prevents the first dog clutch sliding member 26 from moving along the longitudinal axis 61. The second fixed member 20 is disengaged from the second dog clutch sliding member 28 such that no torque is transmitted from the second fixed member 20 to the second dog clutch sliding member 28 as shown in FIG. 2. This disengagement occurs as the result of torque being transmitted from the second fixed member 20 to the second dog clutch sliding member 28 below the third torque threshold in the first relaxed state 120. The second biasing force applied to the second dog clutch sliding member 28 by the separator spring 80 is sufficiently high that it overcomes the torque transmitted from the second fixed member 20 to the second dog clutch sliding member 28 below the third torque threshold and causes the second dog clutch sliding member 28 to move along the longitudinal axis 61 so that it is disengaged from the second fixed member 20.

Figure 3:
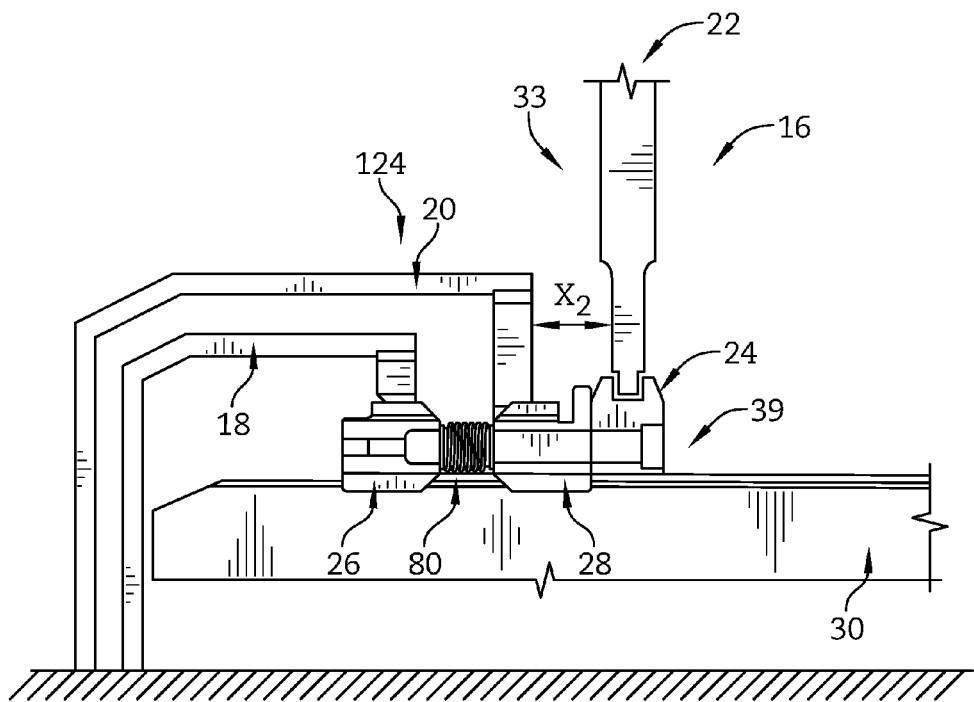
FIG. 3 shows the dog clutch carrier of the multi-positional dog clutch in a third carrier position associated with a second high torque condition.
Figure 4:
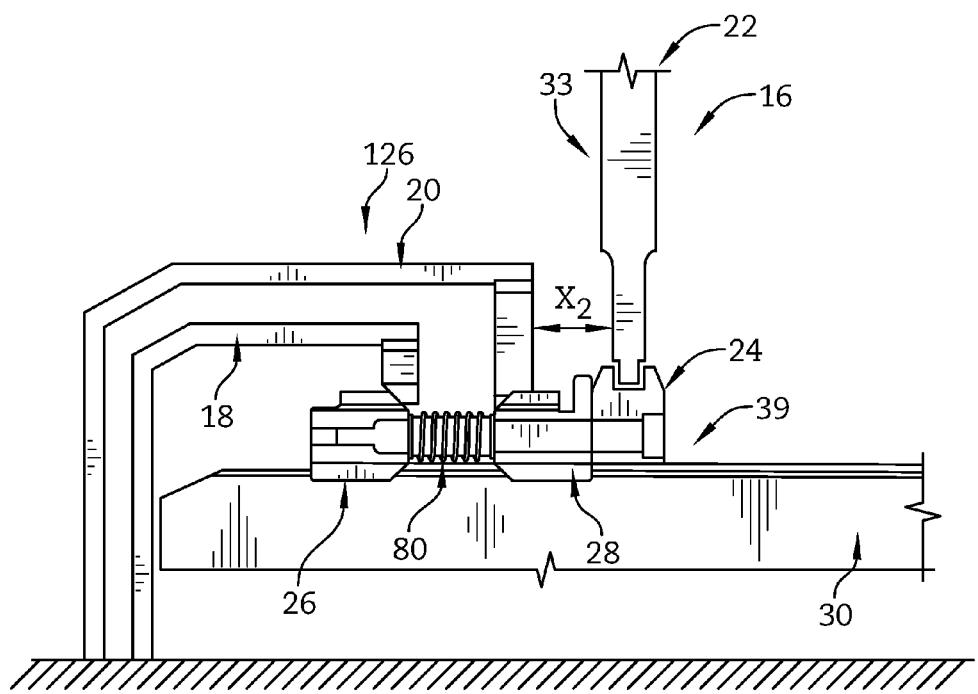
FIG. 4 shows the dog clutch carrier of the multi-positional dog clutch in the third carrier position associated with a second low torque condition.

Referring now to FIG. 3, the multi-positional dog clutch 16 is shown with the shift fork 22 in the third fork position 33 in which the shift fork 22 is spaced apart a distance X2 from the second fixed member 20 and the dog clutch carrier 24 is in the third carrier position 39. As shown in FIGS. 2-4, the distance X2 is less than the distance X1. The first dog clutch sliding member 26 is fully engaged with the first fixed member 18 and the second dog clutch sliding member 28 is partially engaged with the second fixed member 20. The positions of the first and second dog clutch sliding members 26, 28 relative to one another along the longitudinal axis 61 and the length of the separator spring 80 are associated with a second transition state 124.

In the second transition state 124 shown in FIG. 3, torque is transmitted from the first and second fixed members 18, 20 of the transmission 10 to the first and second dog clutch sliding members 26, 28 of the multi-positional dog clutch 16 above a first torque threshold. The torque transmitted from the first fixed member 18 to the first dog clutch sliding member 26 above the first torque threshold is sufficiently high that it overcomes the first biasing force applied to the first dog clutch sliding member 26 by the separator spring 80 and prevents the first dog clutch sliding member 26 from moving along the longitudinal axis 61. Similarly, the torque transmitted from the second fixed member 20 to the second dog clutch sliding member 28 above the first torque threshold is sufficiently high that it overcomes the second biasing force applied to the second dog clutch sliding member 28 by the separator spring 80 and prevents the second dog clutch sliding member 28 from moving along the longitudinal axis 61.

Referring to FIGS. 2-3, the first dog clutch sliding member 26 lies in substantially the same position along the longitudinal axis 61 in the first relaxed state 120 and the second transition state 124. The second dog clutch sliding member 28 is positioned in closer proximity to the first dog clutch sliding member 26 along the longitudinal axis 61 in the second transition state 124 than in the first relaxed state 120. The length of the separator spring 80 is greater in the first relaxed state 120 than in the second transition state 124.

Referring now to FIG. 4, the multi-positional dog clutch 16 is shown with the shift fork 22 in the third fork position 33 in which the shift fork 22 is spaced apart the distance X2 from the second fixed member 20 and the dog clutch carrier 24 is in the third carrier position 39 similar to FIG. 4. The first dog clutch sliding member 26 is partially engaged with the first fixed member 18 and the second dog clutch sliding member 28 is partially engaged with the second fixed member 20. The positions of the first and second dog clutch sliding members 26, 28 relative to one another along the longitudinal axis 61 and the length of the separator spring 80 are associated with a second relaxed state 126.

In the second relaxed state 126 shown in FIG. 4, torque is transmitted from the first and second fixed members 18, 20 of the transmission 10 to the first and second dog clutch sliding members 26, 28 of the multi-positional dog clutch 16 below the first torque threshold. The first biasing force applied to the first dog clutch sliding member 26 by the separator spring 80 is sufficiently high that it overcomes the torque transmitted from the first fixed member 18 to the first dog clutch sliding member 26 below the first torque threshold and causes the first dog clutch sliding member 26 to move along the longitudinal axis 61. The second biasing force applied to the second dog clutch sliding member 28 by the separator spring 80 is sufficiently high that it overcomes the torque transmitted from the second fixed member 20 to the second dog clutch 28 below the first torque threshold and allows the second dog clutch sliding member 28 to move along the longitudinal axis 61. The dog clutch carrier 24, however, prevents the second dog clutch sliding member 28 from moving closer to the shift fork 22 as shown in FIG. 4.

Referring to FIGS. 3-4, the second dog clutch sliding member 28 lies in substantially the same position along the longitudinal axis 61 in both the second transition state 124 and the second relaxed state 126. The first dog clutch sliding member 26 is positioned in closer proximity to the shift fork 22 along the longitudinal axis 61 in the second transition state 124 than in the second relaxed state 126. The length of the separator spring 80 is greater in the second relaxed state 126 than in the second transition state 124.

Figure 5:
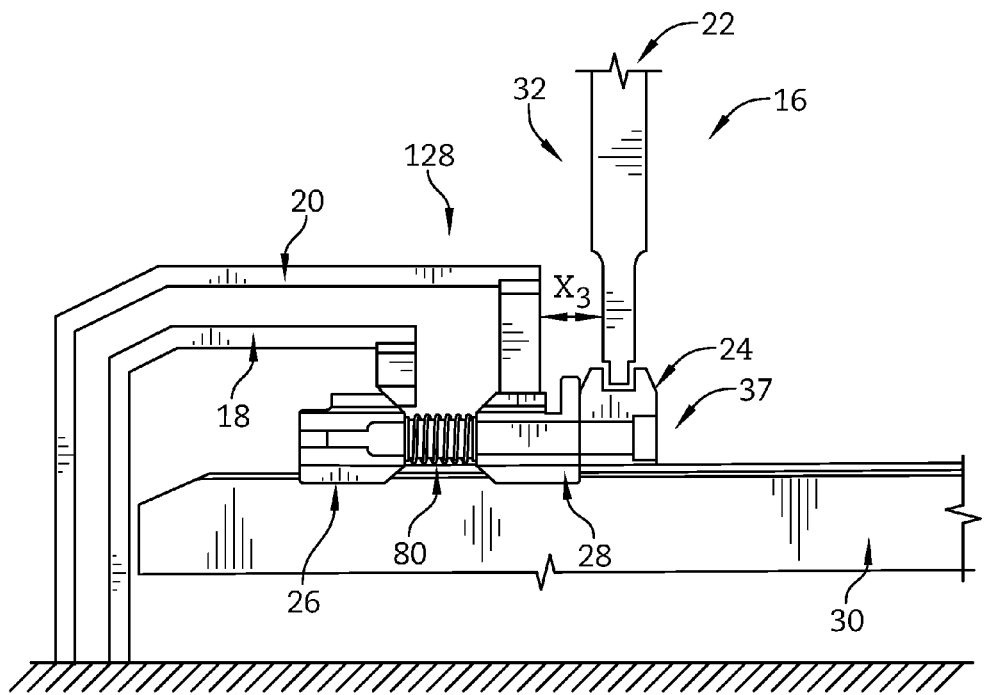
FIG. 5 shows the dog clutch carrier of the multi-positional dog clutch in a second carrier position associated with a third high torque condition.

Referring now to FIG. 5, the multi-positional dog clutch 16 is shown with the shift fork 22 in the second fork position 32 in which the shift fork 22 is spaced apart a distance X3 from the second fixed member 20 and the dog clutch carrier 24 is in the second carrier position 37. As shown in FIGS. 3-5, the distance X3 is less than the distance X2. The first dog clutch sliding member 26 is partially engaged with the first fixed member 18 and the second dog clutch sliding member 28 is fully engaged with the second fixed member 20. The positions of the first and second dog clutch sliding members 26, 28 relative to one another along the longitudinal axis 61 and the length of the separator spring 80 are associated with a third transition state 128.

In the third transition state 128 shown in FIG. 5, torque is transmitted from the first and second fixed members 18, 20 of the transmission 10 to the first and second dog clutch sliding members 26, 28 of the multi-positional dog clutch 16 above a second torque threshold. The torque transmitted from the first fixed member 18 to the first dog clutch sliding member 26 above the second torque threshold is sufficiently high that it overcomes the first biasing force applied to the first dog clutch sliding member 26 by the separator spring 80 and prevents the first dog clutch sliding member 26 from moving along the longitudinal axis 61. Similarly, the torque transmitted from the second fixed member 20 to the second dog clutch sliding member 28 above the second torque threshold is sufficiently high that it overcomes the second biasing force applied to the second dog clutch sliding member 28 by the separator spring 80 and prevents the second dog clutch sliding member 28 from moving along the longitudinal axis 61.

Referring to FIGS. 4-5, the first dog clutch sliding member 26 lies in substantially the same position along the longitudinal axis 61 in the second relaxed state 126 and the third transition state 128. The second dog clutch sliding member 28 is positioned in closer proximity to the first dog clutch sliding member 26 along the longitudinal axis 61 in the third transition state 128 than in the second relaxed state 126. The length of the separator spring 80 is greater in the second relaxed state 126 than in the third transition state 128.

Figure 6:
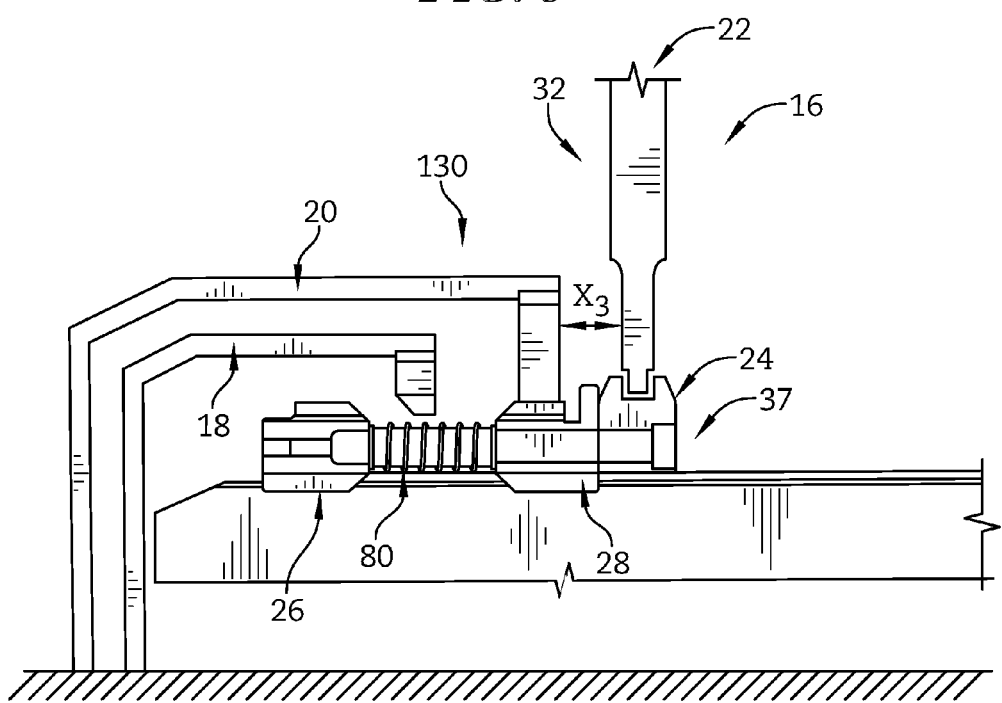
FIG. 6 shows the dog clutch carrier of the multi-positional dog clutch in the second carrier position associated with a third low torque condition.

Referring now to FIG. 6, the multi-positional dog clutch 16 is shown with the shift fork 22 in the second fork position 32 in which the shift fork 22 is spaced apart the distance X3 from the second fixed member 20 and the dog clutch carrier 24 is in the second carrier position 37 similar to FIG. 5. The first dog clutch sliding member 26 is disengaged from the first fixed member 18 and the second dog clutch sliding member 28 is fully engaged with the second fixed member 20. The positions of the first and second dog clutch sliding members 26, 28 relative to one another along the longitudinal axis 61 and the length of the separator spring 80 are associated with a third relaxed state 130.

In the third relaxed state 130 shown in FIG. 6, torque is transmitted from the second fixed member 20 to the second dog clutch sliding member 28 above the second torque threshold. The torque transmitted from the second fixed member 20 to the second dog clutch sliding member 28 above the second torque threshold is sufficiently high that it overcomes the second biasing force applied to the second dog clutch sliding member 28 by the separator spring 80 and prevents the second dog clutch sliding member 28 from moving along the longitudinal axis similar to FIG. 5. The first fixed member 18 is disengaged from the first dog clutch sliding member 26 such that no torque is transmitted from the first fixed member 18 to the first dog clutch sliding member 26 as shown in FIG. 6. This disengagement occurs as the result of torque being transmitted from the first fixed member 18 to the first dog clutch sliding member 26 below the second torque threshold in the third relaxed state 130. The first biasing force applied to the first dog clutch sliding member 26 by the separator spring 80 is sufficiently high that it overcomes the torque transmitted from the first fixed member 18 to the first dog clutch sliding member 26 below the second torque threshold and causes the first dog clutch sliding member 26 to move along the longitudinal axis 61 so that it is disengaged from the first fixed member 18.

Referring to FIGS. 5-6, the second dog clutch sliding member 28 lies in substantially the same position along the longitudinal axis 61 in both the third transition state 128 and the third relaxed state 130. The first dog clutch sliding member 26 is positioned in closer proximity to the shift fork 22 along the longitudinal axis 61 in the third transition state 128 than in the third relaxed state 130. The length of the separator spring 80 is greater in the third relaxed state 130 than in the third transition state 128.

Figure 7:
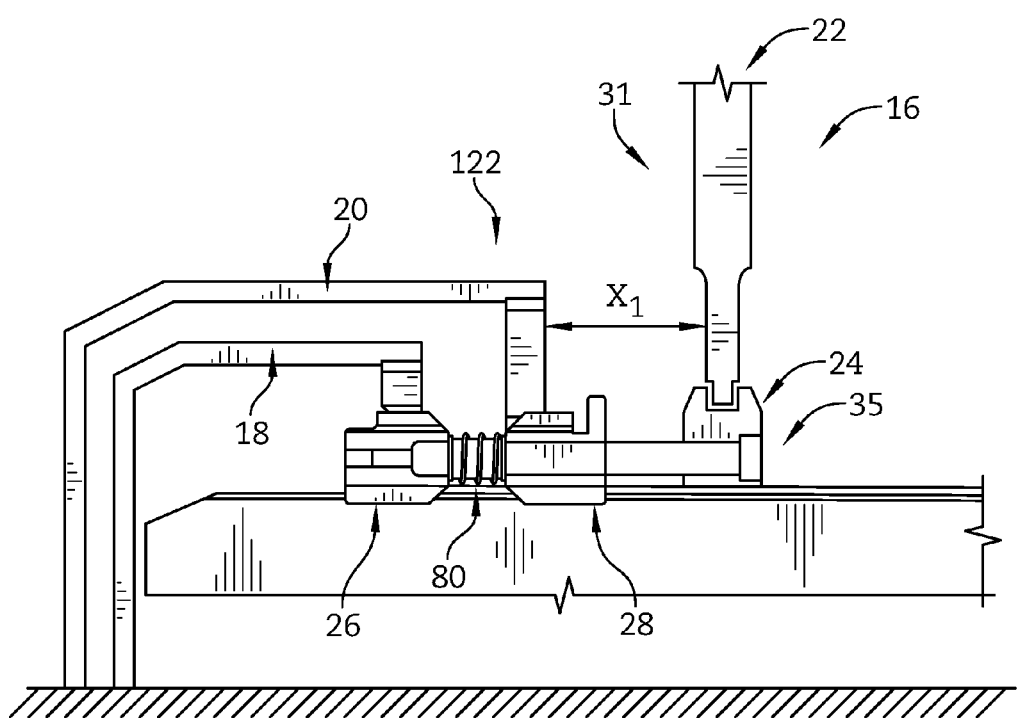
FIG. 7 shows the dog clutch carrier of the multi-positional dog clutch in the first carrier position associated with a first high torque condition.

Referring to FIG. 7, the shift fork 22 is shown in the first fork position 31 and the dog clutch carrier 24 is shown in the first carrier position 35 in which the first dog clutch sliding member 26 is fully engaged with the first fixed member 18 and the second dog clutch sliding member 28 is fully engaged with the second fixed member 20. The positions of the first and second dog clutch sliding members 26, 28 relative to one another along the longitudinal axis 61 and the length of the separator spring 80 are associated with a first transition state 122.

In the first transition state 122 shown in FIG. 7, torque is transmitted from the first and second fixed members 18, 20 of the transmission 10 to the first and second dog clutch sliding members 26, 28 of the multi-positional dog clutch 16 above the third torque threshold. The torque transmitted from the first fixed member 18 to the first dog clutch sliding member 26 above the third torque threshold is sufficiently high that it overcomes the first biasing force applied to the first dog clutch sliding member 26 by the separator spring 80 and prevents the first dog clutch sliding member 26 from moving along the longitudinal axis 61. Similarly, the torque transmitted from the second fixed member 20 to the second dog clutch sliding member 28 above the third torque threshold is sufficiently high that it overcomes the second biasing force applied to the second dog clutch sliding member 28 by the separator spring 80 and prevents the second dog clutch sliding member 28 from moving along the longitudinal axis 61.

Referring to FIGS. 2 & 7, the first dog clutch sliding member 26 lies in substantially the same position along the longitudinal axis 61 in both the first relaxed state 120 and the first transition state 122. The second dog clutch sliding member 28 is positioned in closer proximity to the shift fork 22 along the longitudinal axis 61 in the first transition state 122 than in the first relaxed state 120. The length of the separator spring 80 is greater in the first relaxed state 120 than in the first transition state 122.

Referring to FIGS. 1-7, the multi-positional dog clutch 16 may be selectively engaged with the transmission 10 by moving the dog clutch carrier 24 to the first carrier position 35, moving the dog clutch carrier 24 to the third carrier position 39, and moving the dog clutch carrier 24 to the second carrier position 37. In another example, the multi-positional dog clutch 16 may be selectively engaged with the transmission 10 by moving the dog clutch carrier 24 to the first carrier position 35, moving the dog clutch carrier 24 to the second carrier position 37, and moving the dog clutch carrier 24 to the third carrier position 39. In another example, the multi-positional dog clutch 16 may be selectively engaged with the transmission 10 by moving the dog clutch carrier 24 to the first carrier position 35, disengaging the second fixed member 20 from the second dog clutch sliding member 28 in the first carrier position 35 in response to torque transmitted from the second fixed member 20 to the second dog clutch sliding member 28 falling below the third torque threshold, moving the dog clutch carrier 24 to the third carrier position 39, moving the dog clutch carrier 24 to the second carrier position 37, and disengaging the first fixed member 18 from the first dog clutch sliding member 26 in the second carrier position 37 in response to torque transmitted from the first fixed member 18 to the first dog clutch sliding member 26 falling below the second torque threshold. In yet another example, the multi-positional dog clutch 16 may be selectively engaged with the transmission 10 by moving the dog clutch carrier 24 to the first carrier position 35, disengaging the second fixed member 20 from the second dog clutch sliding member 28 in the first carrier position 35 in response to torque transmitted from the second fixed member 20 to the second dog clutch sliding member 28 falling below the third torque threshold, moving the dog clutch carrier 24 to the second carrier position 37, disengaging the first fixed member 18 from the first dog clutch sliding member 26 in the second carrier position 37 in response to torque transmitted from the first fixed member 18 to the first dog clutch sliding member 26 falling below the second torque threshold, and moving the dog clutch carrier 24 to the third carrier position 39.

The invention claimed is:

1. A multi-positional dog clutch comprising
   a dog clutch carrier including a carrier pin;
   a first dog clutch sliding member coupled to the carrier pin and engaged with a common member, the first dog clutch sliding member configured to engage with and disengage from a first fixed member of a transmission;
   a second dog clutch sliding member coupled to the carrier pin and engaged with the common member, the second dog clutch sliding member configured to engage with and disengage from a second fixed member of the transmission; and
   a separator spring surrounding the dog clutch carrier between the first dog clutch sliding member and the second dog clutch sliding member,
   wherein the dog clutch carrier is movable to (i) a first carrier position in which the first dog clutch sliding member is engaged with the first fixed member, (ii) a second carrier position in which the second dog clutch sliding member is engaged with the second fixed member, and (iii) a third carrier position in which the first dog clutch sliding member is engaged with the first fixed member and the second dog clutch sliding member is engaged with the second fixed member.

2. The multi-positional dog clutch of claim 1, wherein the carrier extends through the first and second dog clutch sliding members.

3. The multi-positional dog clutch of claim 2, wherein the carrier pin extends into an inner passageway of the separator spring.

4. The multi-positional dog clutch of claim 2, wherein the carrier pin defines a longitudinal axis and the first and second dog clutch sliding members are movable along the longitudinal axis to engage with the corresponding first and second fixed member.

5. The multi-positional dog clutch of claim 3, wherein the common member comprises a spline and the first dog clutch sliding member comprises a first spline engaged with the spline of the common member in each of the first, second, and third carrier positions of the dog clutch carrier.

6. The multi-positional dog clutch of claim 4, wherein the second dog clutch sliding member comprises a second spline engaged with the spline of the common member in each of the first, second, and third carrier positions of the dog clutch carrier.

7. The multi-positional dog clutch of claim 4, wherein the first dog clutch sliding member includes a third spline and the third spline is engaged with a spline of the first fixed member when the first dog clutch sliding member is engaged with the first fixed member.

8. The multi-positional dog clutch of claim 7, wherein the second dog clutch sliding member includes a fourth spline and the fourth spline is engaged with a spline of the second fixed member when the second dog clutch sliding member is engaged with the second fixed member.

9. The multi-positional dog clutch of claim 1, further comprising a shift fork coupled to the dog clutch carrier and actuatable to move the dog clutch carrier to the first, second, and third carrier positions, wherein the shift fork is spaced apart from the second fixed member a first distance in the first carrier position, a second distance less than the first distance in the second carrier position, and a third distance greater than the second distance in the third carrier position.

10. A transmission comprising,
    a shift fork;

a dog clutch carrier coupled to the shift fork, the dog clutch carrier including a carrier pin defining a longitudinal axis;
a first fixed member;
a second fixed member;
a first dog clutch sliding member separate from the dog clutch carrier that is coupled to the carrier pin, the first dog clutch sliding member movable along the longitudinal axis to selectively engage the first fixed member;
a second dog clutch sliding member separate from the dog clutch carrier that is coupled to the carrier pin, the second dog clutch sliding member movable along the longitudinal axis to selectively engage the second fixed member;
a common member engaged with each of the first dog clutch sliding member and the second dog clutch sliding member; and
a separator spring surrounding the dog clutch carrier between the first dog clutch sliding member and the second dog clutch sliding member,
wherein the shift fork is actuatable to move the dog clutch carrier to (i) a first carrier position in which the first dog clutch sliding member is engaged with the first fixed member, (ii) a second carrier position in which the second dog clutch sliding member is engaged with the second fixed member, and (iii) a third carrier position in which the first dog clutch sliding member is engaged with the first fixed member and the second dog clutch sliding member is engaged with the second fixed member.

11. The transmission of claim 10, wherein the separator spring applies a biasing force to each of the first and second dog clutch sliding members to outwardly bias the first and second dog clutch sliding members from each other.

12. The transmission of claim 11, wherein the first fixed member is engaged with the first dog clutch sliding member in the third carrier position such that the first dog clutch sliding member is prevented from moving along the longitudinal axis while a torque transmitted from the first fixed member to the first dog clutch sliding member is above a first torque threshold.

13. The transmission of claim 12, wherein the first fixed member is engaged with the first dog clutch sliding member in the third carrier position such that the biasing force of the separator spring is sufficient to move the first dog clutch sliding member along the longitudinal axis in response to the transmitted torque falling below the first torque threshold.

14. The transmission of claim 11, wherein the first fixed member is engaged with the first dog clutch sliding member in the second carrier position such that the first dog clutch sliding member is prevented from moving along the longitudinal axis while a torque transmitted from the first fixed member to the first dog clutch sliding member is above a second torque threshold.

15. The transmission of claim 14, wherein the first fixed member is engaged with the first dog clutch sliding member in the second carrier position such that the biasing force of the separator spring is sufficient to move the first dog clutch sliding member along the longitudinal axis in response to the transmitted torque falling below the second torque threshold.

16. The transmission of claim 11, wherein the second fixed member is engaged with the second dog clutch sliding member in the first carrier position such that the second dog clutch sliding member is prevented from moving along the longitudinal axis while a torque transmitted from the second fixed member to the second dog clutch sliding member is above a third torque threshold.

17. The transmission of claim 16, wherein the second fixed member is engaged with the second dog clutch sliding member in the first carrier position such that the biasing force of the separator spring is sufficient to move the second dog clutch sliding member along the longitudinal axis in response to the transmitted torque falling below the third torque threshold.

18. A method for selectively engaging a multi-positional dog clutch with a transmission, the method comprising:
moving a dog clutch carrier of the multi-positional dog clutch to a first carrier position in which (i) a first dog clutch sliding member of the multi-positional dog clutch separate from the dog clutch carrier and coupled to a carrier pin of the dog clutch carrier is engaged with a first fixed member of the transmission and (ii) a second dog clutch sliding member of the multi-positional dog clutch separate from the dog clutch carrier and coupled to the carrier pin is disengaged from a second fixed member of the transmission;
moving the dog clutch carrier to a second carrier position in which (i) the first dog clutch sliding member is disengaged from the first fixed member and (ii) the second dog clutch sliding member is engaged with the second fixed member; and
moving the dog clutch carrier to a third carrier position in which (i) the first dog clutch sliding member is engaged with the first fixed member and (ii) the second dog clutch sliding member is engaged with the second fixed member.

19. The method of claim 18, further comprising:
disengaging the second fixed member from the second dog clutch sliding member when the dog clutch carrier is in the first carrier position in response to a torque transmitted from the second fixed member to the second dog clutch sliding member falling below a first torque threshold; and
disengaging the first fixed member from the first dog clutch sliding member when the dog clutch carrier is in the second carrier position in response to a torque transmitted from the first fixed member to the first dog clutch sliding member falling below a second torque threshold.

* * * * *